(12) United States Patent
Kachmar (10) Patent No.: US 9,739,966 B2
(45) Date of Patent: Aug. 22, 2017

(54) FIBER OPTIC CABLE WITH ELECTRICAL CONDUCTORS

(75) Inventor: Wayne M. Kachmar, North Bennington, VT (US)

(73) Assignee: CommScope Technologies LLC, Hickory, NC (US)

( * ) Notice: Subject to any disclaimer, the term of this patent is extended or adjusted under 35 U.S.C. 154(b) by 218 days.

(21) Appl. No.: 13/371,899

(22) Filed: Feb. 13, 2012

(65) Prior Publication Data

US 2012/0230637 A1  Sep. 13, 2012

Related U.S. Application Data

(60) Provisional application No. 61/586,362, filed on Jan. 13, 2012, provisional application No. 61/442,619, filed on Feb. 14, 2011.

(51) Int. Cl.
*G02B 6/44* (2006.01)
*G02B 6/38* (2006.01)

(52) U.S. Cl.
CPC .......... *G02B 6/4416* (2013.01); *G02B 6/443* (2013.01); *G02B 6/3895* (2013.01); *G02B 6/4469* (2013.01)

(58) Field of Classification Search
USPC ........................................ 385/101
See application file for complete search history.

(56) References Cited

U.S. PATENT DOCUMENTS

| | | |
|---|---|---|
| 3,873,389 A | 3/1975 | Daniels |
| 3,903,354 A | 9/1975 | Dageförde |
| 3,991,014 A | 11/1976 | Kleinschuster |
| 4,067,852 A | 1/1978 | Calundann |
| 4,083,829 A | 4/1978 | Calundann et al. |
| 4,089,585 A | 5/1978 | Slaughter et al. |
| 4,130,545 A | 12/1978 | Calundann |
| 4,161,470 A | 7/1979 | Calundann |
| 4,199,225 A | 4/1980 | Slaughter et al. |
| 4,239,336 A * | 12/1980 | Parfree et al. ............... 385/101 |
| 4,304,462 A | 12/1981 | Baba et al. |
| 4,318,842 A | 3/1982 | East et al. |

(Continued)

FOREIGN PATENT DOCUMENTS

| | | |
|---|---|---|
| CN | 2667513 Y | 12/2004 |
| CN | 2722273 Y | 8/2005 |

(Continued)

OTHER PUBLICATIONS

ADC Spec Sheet, Fiber Optic Cable, Ruggedized Simplex and Duplex Cables, ADC®, Oct. 2005, 4 pages.

(Continued)

*Primary Examiner* — Charlie Y Peng
(74) *Attorney, Agent, or Firm* — Merchant & Gould P.C.

(57) ABSTRACT

A fiber optic cable includes an optical fiber, a strength layer assembly disposed adjacent to the optical fiber and an outer jacket surrounding the strength layer assembly. The strength layer assembly includes a strength layer, an outer layer and an inner layer. The strength layer includes a binder and a plurality of reinforcing fibers embedded within the binder. The strength layer has a first surface and an oppositely disposed second surface. The outer layer is disposed adjacent to the first surface of the strength layer. The inner layer is disposed adjacent to the second surface of the strength layer.

20 Claims, 9 Drawing Sheets

(56) References Cited

U.S. PATENT DOCUMENTS

| | | |
|---|---|---|
| 4,359,598 A | 11/1982 | Dey et al. |
| 4,458,388 A | 7/1984 | Farago et al. |
| 4,468,364 A | 8/1984 | Ide |
| 4,515,435 A | 5/1985 | Anderson |
| 4,557,560 A | 12/1985 | Bohannon et al. |
| 4,569,420 A | 2/1986 | Pickett et al. |
| 4,595,793 A | 6/1986 | Arroyo et al. |
| 4,626,306 A | 12/1986 | Chabrier et al. |
| 4,644,098 A | 2/1987 | Norris et al. |
| 4,659,174 A | 4/1987 | Ditscheid et al. |
| 4,661,406 A | 4/1987 | Gruhn et al. |
| 4,710,594 A | 12/1987 | Walling et al. |
| 4,729,628 A | 3/1988 | Kraft et al. |
| 4,730,894 A * | 3/1988 | Arroyo ............... 385/113 |
| 4,761,053 A | 8/1988 | Cogelia et al. |
| 4,807,962 A | 2/1989 | Arroyo et al. |
| 4,810,834 A | 3/1989 | Grögl et al. |
| 4,818,060 A | 4/1989 | Arroyo |
| 4,844,575 A | 7/1989 | Kinard et al. |
| 4,852,965 A | 8/1989 | Mullin et al. |
| 4,852,966 A | 8/1989 | Kimmich et al. |
| 4,895,427 A | 1/1990 | Kraft |
| 4,909,592 A | 3/1990 | Arroyo et al. |
| 5,015,063 A | 5/1991 | Panuska et al. |
| 5,125,063 A | 6/1992 | Panuska et al. |
| 5,131,064 A | 7/1992 | Arroyo et al. |
| 5,157,752 A | 10/1992 | Greveling et al. |
| 5,214,730 A | 5/1993 | Nagasawa et al. |
| 5,229,851 A | 7/1993 | Rahman |
| 5,253,318 A | 10/1993 | Sayegh et al. |
| 5,329,605 A * | 7/1994 | Wargotz ............... 385/107 |
| 5,345,525 A | 9/1994 | Holman et al. |
| 5,345,526 A | 9/1994 | Blew |
| 5,469,523 A * | 11/1995 | Blew ............... G02B 6/4403 385/101 |
| 5,503,928 A | 4/1996 | Cheshire |
| 5,557,698 A | 9/1996 | Gareis et al. |
| 5,573,857 A | 11/1996 | Auger |
| 5,574,815 A * | 11/1996 | Kneeland ............... G02B 6/3817 174/70 R |
| 5,593,524 A | 1/1997 | Philips |
| 5,627,932 A | 5/1997 | Kiel et al. |
| 5,642,452 A | 6/1997 | Gravely et al. |
| 5,656,796 A | 8/1997 | Marinos et al. |
| 5,737,470 A | 4/1998 | Nagano et al. |
| 5,838,864 A | 11/1998 | Patel et al. |
| 5,925,461 A | 7/1999 | Fairgrieve |
| 5,970,196 A | 10/1999 | Greveling et al. |
| 5,978,536 A | 11/1999 | Brandi et al. |
| 5,982,966 A | 11/1999 | Bonicel |
| 6,014,487 A | 1/2000 | Field et al. |
| 6,088,499 A | 7/2000 | Newton et al. |
| 6,137,936 A | 10/2000 | Fitz et al. |
| 6,195,487 B1 * | 2/2001 | Anderson ............... G02B 6/4416 174/23 R |
| 6,236,789 B1 * | 5/2001 | Fitz ............... H01B 9/005 385/100 |
| 6,249,628 B1 | 6/2001 | Rutterman et al. |
| 6,256,438 B1 | 7/2001 | Gimblet |
| 6,270,851 B1 | 8/2001 | Lee et al. |
| 6,284,367 B1 | 9/2001 | Gruhn et al. |
| 6,321,012 B1 | 11/2001 | Shen |
| 6,347,172 B1 | 2/2002 | Keller et al. |
| 6,348,236 B1 | 2/2002 | Fairgrieve et al. |
| 6,356,690 B1 | 3/2002 | McAlpine et al. |
| 6,370,303 B1 | 4/2002 | Fitz et al. |
| 6,463,198 B1 * | 10/2002 | Coleman ............... G02B 6/4416 385/101 |
| 6,493,491 B1 | 12/2002 | Shen et al. |
| 6,496,627 B1 | 12/2002 | Tuminaro |
| 6,542,674 B1 | 4/2003 | Gimblet |
| 6,621,964 B2 | 9/2003 | Quinn et al. |
| 6,654,527 B2 | 11/2003 | Sakabe et al. |
| 6,701,047 B1 | 3/2004 | Rutterman et al. |
| 6,744,954 B1 | 6/2004 | Tanaka et al. |
| 6,807,347 B2 | 10/2004 | McAlpine et al. |
| 6,813,422 B1 | 11/2004 | Krishnamurthy et al. |
| 6,836,603 B1 | 12/2004 | Bocanegra et al. |
| 6,894,218 B2 | 5/2005 | Kohn et al. |
| 6,897,382 B2 | 5/2005 | Hager et al. |
| 6,899,776 B2 | 5/2005 | Bahlmann et al. |
| 6,901,191 B2 | 5/2005 | Hurley et al. |
| 6,937,801 B2 | 8/2005 | McAlpine et al. |
| 7,006,740 B1 | 2/2006 | Parris |
| 7,068,893 B2 * | 6/2006 | Oh ............... H01B 7/324 385/101 |
| 7,113,680 B2 | 9/2006 | Hurley et al. |
| 7,218,821 B2 | 5/2007 | Bocanegra et al. |
| 7,227,084 B2 | 6/2007 | Bates et al. |
| 7,244,337 B2 | 7/2007 | Bahlmann et al. |
| 7,349,642 B2 | 3/2008 | Tatematsu et al. |
| 7,458,103 B2 | 12/2008 | Citterio et al. |
| 8,031,996 B2 | 10/2011 | Willemsen et al. |
| 2002/0025127 A1 | 2/2002 | Graham et al. |
| 2006/0137156 A1 | 6/2006 | Kawabe et al. |
| 2006/0159407 A1 | 7/2006 | Kachmar |
| 2006/0280413 A1 | 12/2006 | Paschal et al. |
| 2006/0291787 A1 | 12/2006 | Seddon |
| 2007/0127878 A1 | 6/2007 | de Montmorillon et al. |
| 2007/0189699 A1 | 8/2007 | Matsuo et al. |
| 2007/0280615 A1 | 12/2007 | de Montmorillon et al. |
| 2008/0187276 A1 | 8/2008 | Roberts et al. |
| 2009/0297104 A1 * | 12/2009 | Kachmar ............... 385/101 |
| 2009/0317039 A1 | 12/2009 | Blazer et al. |
| 2010/0215327 A1 * | 8/2010 | Braden ............... G02B 6/4403 385/101 |
| 2010/0266247 A1 | 10/2010 | Willemsen et al. |
| 2010/0322573 A1 | 12/2010 | Yasutomi et al. |

FOREIGN PATENT DOCUMENTS

| | | |
|---|---|---|
| EP | 316922 | 11/1988 |
| EP | 569928 | 5/1993 |
| EP | 0837162 | 4/1998 |
| GB | 1 433 128 | 8/1972 |
| GB | 1 483 845 | 8/1977 |
| GB | 2 096 343 A | 10/1982 |
| GB | 2 296 575 A | 7/1996 |
| JP | 57-186708 | 11/1982 |
| JP | 10-130996 | 5/1998 |
| JP | 2001-166188 | 6/2001 |
| JP | 2001-208942 | 8/2001 |
| JP | 2001-337255 | 12/2001 |
| JP | 2003-300744 | 10/2003 |
| JP | 2006-313314 | 11/2006 |
| KR | 2000-0046917 | 7/2000 |
| KR | 10-2006-0107414 | 10/2006 |
| WO | 03/091006 | 11/2003 |
| WO | 2004/090628 | 10/2004 |
| WO | 2009/068541 | 6/2009 |

OTHER PUBLICATIONS

ADC Spec Sheet, Fiber Optic Cable, Tactical Cables, ADC®, Oct. 2005, 4 pages.

Description of Fiber Optic Cable—LCF Microcable: Plenum, 6 pages (Aug. 2005).

Fiber Optic Cable LCF Microcable: Plenum, *ADC Telecommunications, Inc.*, 4 pages (Aug. 2005).

International Search Report and Written Opinion mailed Jan. 25, 2010.

Superior Essex, FTTP Tight Buffered Indoor/Outdoor Drop, Series W7, RoHS, Product Bulletin, OSP Fiber Produtcs, Nov. 2008, 2 pages.

Teijin, Making the Zetta World Possible, Oct. 2009, 2 pages.

International Search Report and Written Opinion mailed Sep. 19, 2012.

\* cited by examiner

FIBER OPTIC CABLE WITH ELECTRICAL CONDUCTORS

CROSS REFERENCE TO RELATED APPLICATIONS

This application claims the benefit of U.S. Provisional Application No. 61/442,619, filed Feb. 14, 2011, and titled "Fiber Optic Cable with Electrical Conductors," and U.S. Provisional Application No. 61/586,362, filed Jan. 13, 2012, and titled "Fiber Optic Cable with Electrical Conductors," the disclosures of which are hereby incorporated herein by reference.

BACKGROUND

A fiber optic cable typically includes: (1) an optical fiber; (2) a buffer layer that surrounds the optical fiber; (3) a plurality of strength members loosely surrounding the buffer layer; and (4) an outer jacket. Optical fibers function to carry optical signals. A typical optical fiber includes an inner core surrounded by a cladding that is protected by a coating. The buffer layer functions to surround and protect the coated optical fibers. Strength members add mechanical strength to fiber optic cables to protect the internal optical fibers against stresses applied to the cables during installation and thereafter. Outer jackets also provide protection against chemical damages.

The use of strength members that loosely surround the optical fiber can create difficulties in manufacturing and/or installing fiber optic cables as these loosely situated strength members can be difficult to cut and difficult to use in automated manufacturing processes.

SUMMARY

An aspect of the present disclosure relates to a fiber optic cable. The fiber optic cable includes an optical fiber, a strength layer assembly disposed adjacent to the optical fiber and an outer jacket surrounding the strength layer assembly. The strength layer assembly includes a strength layer, an outer layer and an inner layer. The strength layer includes a binder and a plurality of reinforcing fibers embedded within the binder. The strength layer has a first surface and an oppositely disposed second surface. The outer layer is disposed adjacent to the first surface of the strength layer and includes a first conductive portion. The inner layer is disposed adjacent to the second surface of the strength layer and includes a second conductive portion.

Another aspect of the present disclosure relates to a fiber optic cable. The fiber optic cable includes an optical fiber, a strength layer assembly surrounding the optical fiber and an outer jacket surrounding the strength layer assembly. The strength layer assembly includes a strength layer, an outer layer and an inner layer. The strength layer has a first longitudinal side, an oppositely disposed second longitudinal side, a first surface that extends between the first and second longitudinal sides and an oppositely disposed second surface. The strength layer includes a binder and a plurality of reinforcing fibers embedded within the binder. The strength layer is arranged so that the first longitudinal side overlaps the second longitudinal side to form a longitudinal bore in which the optical fiber is disposed. The outer layer is disposed adjacent to the first surface of the strength layer. The outer layer has a first side end that is offset from the first longitudinal side by a first offset distance and a second side end that is offset from the second longitudinal side by a second offset distance. The outer layer includes a first conductive portion. The inner layer is disposed adjacent to the second surface of the strength layer. The inner layer includes a second conductive portion.

Another aspect of the present disclosure relates to a fiber optic cable. The fiber optic cable includes an optical fiber; a jacket surrounding the optical fiber; and a strength layer positioned between the optical fiber and the jacket. The strength layer includes a reinforcing sheet including a plurality of reinforcing fibers. The reinforcing sheet extends around a central axis of the cable and has circumferential overlap portions that circumferentially overlap one another by at least 90 degrees. The reinforcing sheet of certain types of cables has circumferential overlap portions that circumferentially overlap one another by at least 180 degrees. The reinforcing sheet of certain types of cables has circumferential overlap portions that circumferentially overlap one another by at least 270 degrees. The reinforcing sheet of certain types of cables has circumferential overlap portions that circumferentially overlap one another by at least 360 degrees.

Another aspect of the present disclosure relates to a fiber optic cable. The fiber optic cable includes an optical fiber; a jacket surrounding the optical fiber; a strength layer positioned between the optical fiber and the jacket, a first conductive strip attached to the inner side of the strength layer, and a second conductive strip attached to the outer side of the strength layer. The strength layer includes a reinforcing sheet including a plurality of reinforcing fibers. The reinforcing sheet extends around the central axis of the cable to form a cylindrical shape. The first and second conductive strips have lengths that extend along a length of the cable. Certain example types of conductive strips include conductive tapes.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
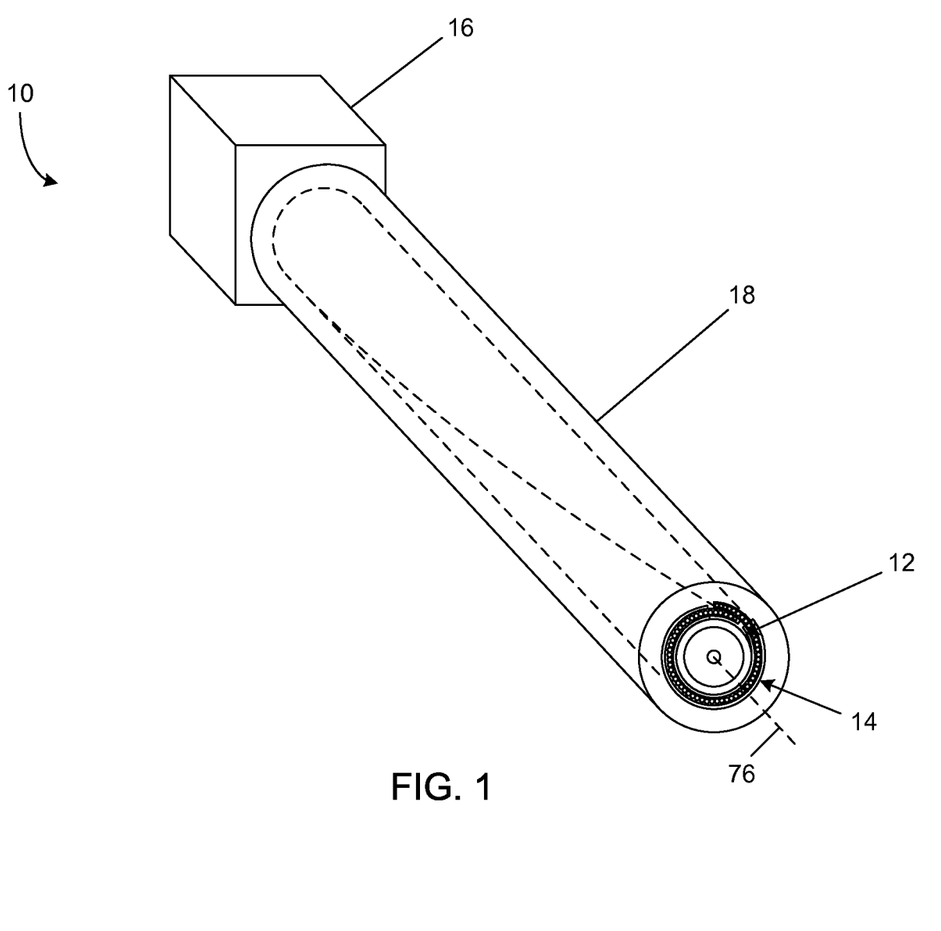
FIG. 1 is a fragmentary perspective view of a fiber optic cable having features that are examples of aspects in accordance with the principles of the present disclosure.

Referring now to FIG. 1, a fiber optic cable, generally designated 10, is shown. The fiber optic cable 10 includes at least one optical fiber 12, a strength layer assembly 14 surrounding the optical fiber 12, and an outer jacket 18 surrounding the strength layer 14. In the subject embodiment, the fiber optic cable 10 includes a connector 16 disposed at an end of the fiber optic cable 10.

Figure 2:
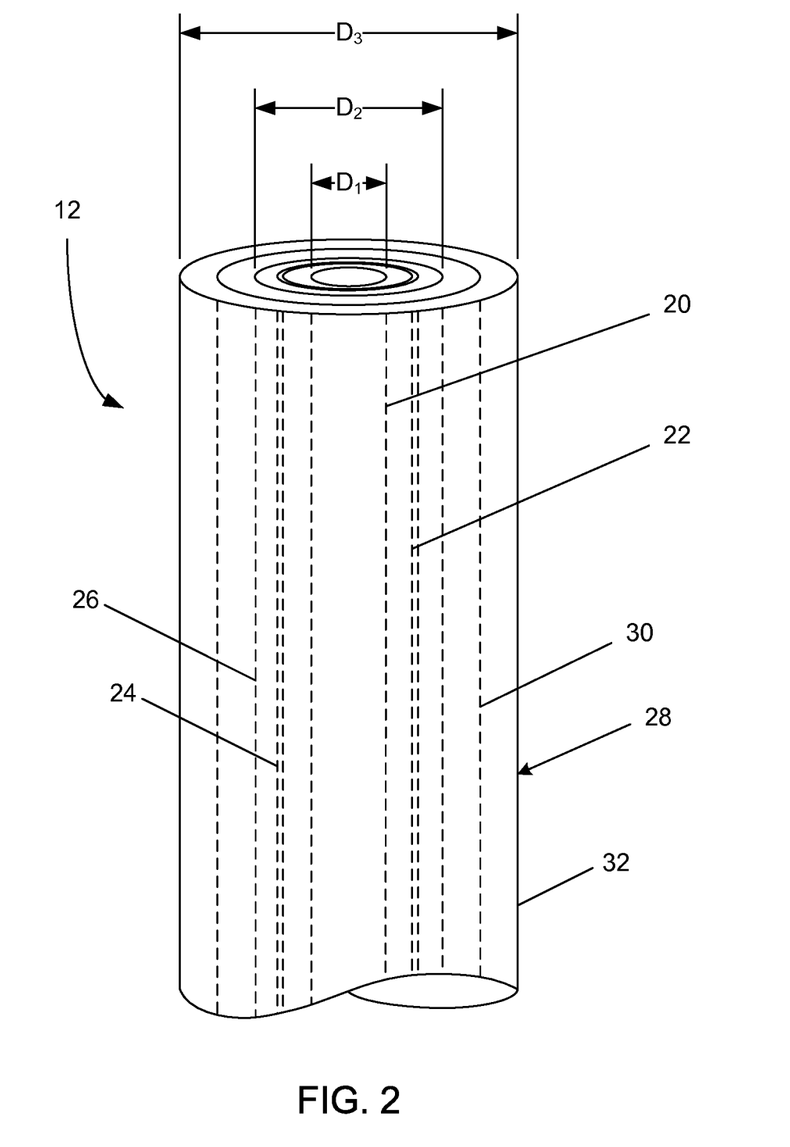
FIG. 2 is a perspective view of an optical fiber suitable for use in the fiber optic cable of FIG. 1.

Referring now to FIG. 2, the optical fiber 12 includes a core 20. The core 20 is made of a glass material, such as a silica-based material, having an index of refraction. In the subject embodiment, the core 20 has an outer diameter $D_1$ of less than or equal to about 10 µm.

The core 20 of each optical fiber 12 is surrounded by a first cladding layer 22 that is also made of a glass material, such as a silica based-material. The first cladding layer 22 has an index of refraction that is less than the index of refraction of the core 20. This difference between the index of refraction of the first cladding layer 22 and the index of refraction of the core 20 allows an optical signal that is transmitted through the optical fiber 12 to be confined to the core 20.

A trench layer 24 surrounds the first cladding layer 22. The trench layer 24 has an index of refraction that is less than the index of refraction of the first cladding layer 22. In the subject embodiment, the trench layer 24 is immediately adjacent to the first cladding layer 22.

A second cladding layer 26 surrounds the trench layer 24. The second cladding layer has an index of refraction. In the subject embodiment, the index of refraction of the second cladding layer 26 is about equal to the index of refraction of the first cladding layer 22. The second cladding layer 26 is immediately adjacent to the trench layer 24. In the subject embodiment, the second cladding layer 26 has an outer diameter $D_2$ of less than or equal to 125 µm.

A coating, generally designated 28, surrounds the second cladding layer 26. The coating 28 includes an interior layer 30 and an exterior layer 32. In the subject embodiment, the interior layer 30 of the coating 28 is immediately adjacent to the second cladding layer 26 such that the interior layer 30 surrounds the second cladding layer 26. The interior layer 30 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the interior layer 30 functions to protect the optical fiber 12 from microbending.

The exterior layer 32 of the coating 28 is a polymeric material having a higher modulus of elasticity than the interior layer 30. In the subject embodiment, the exterior layer 32 of the coating 28 is immediately adjacent to the interior layer 30 such that the exterior layer 32 surrounds the interior layer 30. The higher modulus of elasticity of the exterior layer 32 functions to mechanically protect and retain the shape of optical fiber 12 during handling. In the subject embodiment, the exterior layer 32 defines an outer diameter $D_3$ of less than or equal to 500 µm. In another embodiment, the exterior layer 32 has an outer diameter $D_3$ of less than or equal to 250 µm.

In the subject embodiment, the optical fiber 12 is manufactured to reduce the sensitivity of the optical fiber 12 to micro or macro-bending (hereinafter referred to as "bend insensitive"). An exemplary bend insensitive optical fiber 12 has been described in U.S. Pat. Application Publication Nos. 2007/0127878 and 2007/0280615 and are hereby incorporated by reference in their entirety. An exemplary bend insensitive optical fiber 12 suitable for use in the fiber optic cable 10 of the present disclosure is commercially available from Draka Comteq under the name BendBright XS.

Figure 3:
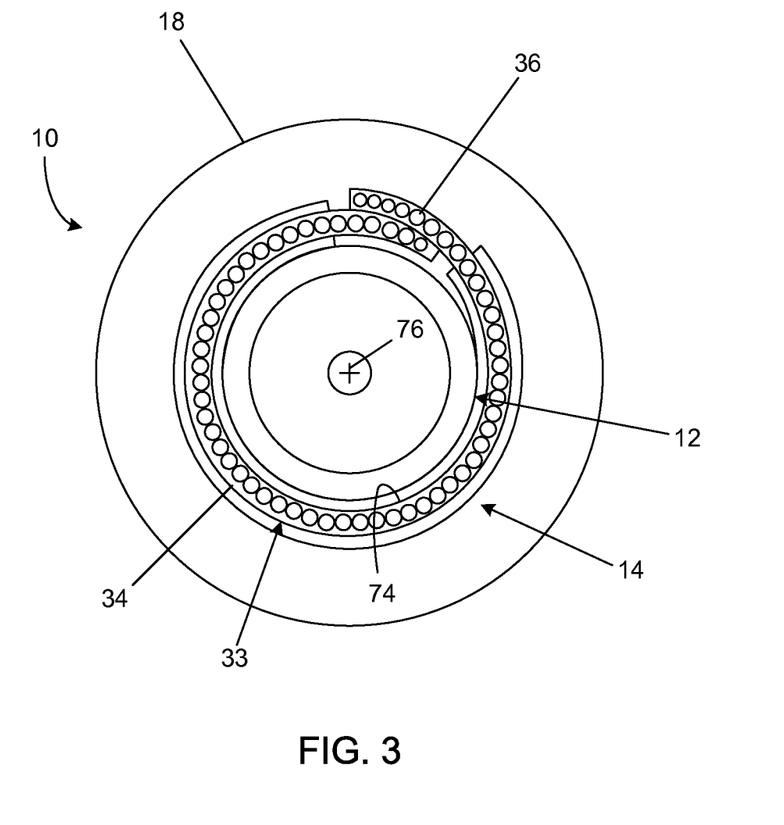
FIG. 3 is a cross-sectional view of the fiber optic cable of FIG. 1.
Figure 4:
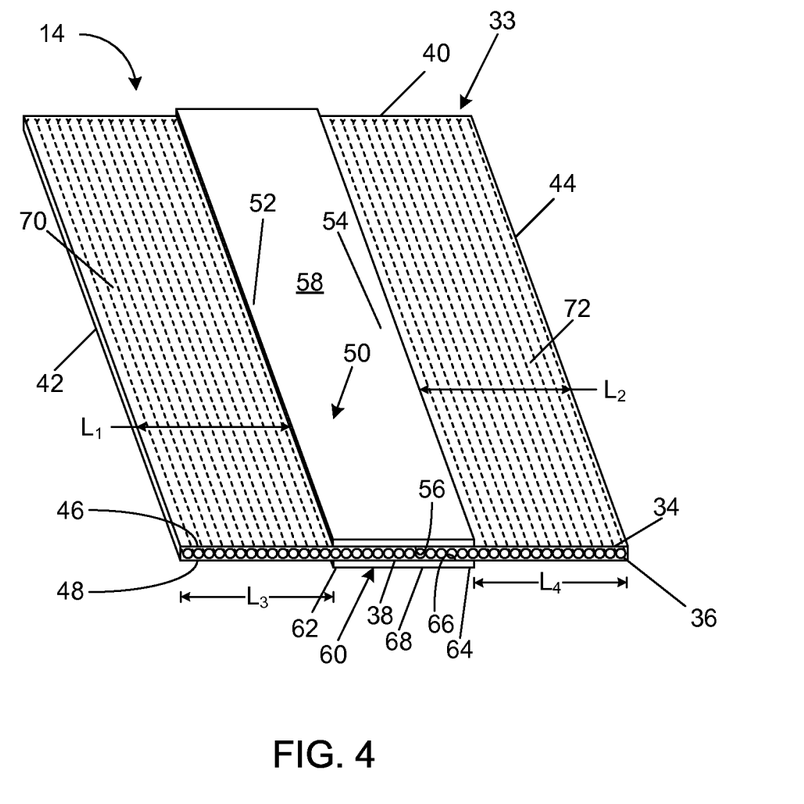
FIG. 4 is perspective view of a pre-formed strength layer assembly of the fiber optic cable of FIG. 1.

Referring now to FIGS. 3-4, the strength layer assembly 14 is a flat and flexible sheet, film, or layer of material that is adapted to surround the optical fibers 12. The strength layer assembly 14 is flat in that the width and the height of the strength layer assembly 14 are generally consistent throughout the length of the strength layer assembly 14 and in that the width of the strength layer assembly 14 is greater than the height of the strength layer assembly 14 throughout the length of the strength layer assembly 14. For example, in one embodiment, the strength layer assembly 14 has a width of 0.12 inches and a height of 0.030 inches. In other examples, the width of the strength layer assembly 14 may be five, ten, or fifteen times greater than the height of the strength layer assembly 14. Other proportions of the width of the strength layer assembly 14 to the height of strength layer assembly 14 may be possible.

The strength layer assembly 14 includes a strength layer 33. The strength layer 33 includes a binder 34 and a plurality of reinforcing fibers 36 embedded or otherwise integrated within the binder 34. In one example embodiment, the binder 34 is a polymeric material such as ethylene acetate, acrylite (e.g., UV-cured, etc.), silicon (e.g., RTV, etc.), polyester films (e.g., biaxially oriented polyethylene terephthalate polyester film, etc.), and polyisobutylene. In other example instances, binder 34 may be a matrix material, an adhesive material, a finish material, or another type of material that binds, couples, or otherwise mechanically links together reinforcing fibers 36.

The reinforcing fibers 36 are strands that extend the length of the strength layer 14. It will be understood, however, that the scope of the present disclosure is not limited to the reinforcing fibers 36 extending the length of the strength layer assembly 14. In one embodiment, the reinforcing fibers 36 are aramid fibers. In another embodiment, the reinforcing fibers 36 are glass fibers, such as E-glass, S-glass, or another type of glass fiber. The width and height of the strength layer 33 may vary depending on the type of material from which the reinforcing fibers 36 are made. For example, when the strength layer 33 is made of E-glass or S-glass, the strength layer 33 may have a width of 0.085 inches and a height of 0.045 inches. In another example in which the strength layer is made of aramid fibers, the strength layer 33 may have a width of 0.12 inches and a height of 0.030 inches. It will be understood that the strength layer 33 may other widths and heights.

The reinforcing fibers 36 are disposed in a single layer within the binder 34. It will be understood, however, that the scope of the present disclosure is not limited to the reinforcing fibers 36 being disposed in a single layer as the reinforcing fibers 36 could be disposed in multiple layers.

For example, the reinforcing fibers 36 may be disposed in groups. In this example, the reinforcing fibers 36 may be disposed in groups comprising a variety of different numbers of reinforcing fibers. For instance, each of the groups may comprise 500 reinforcing fibers, 1000 reinforcing fibers, 1500 reinforcing fibers, 2000 reinforcing fibers, or other numbers of reinforcing fibers. Furthermore, in some instances, not all of the groups have the same number of reinforcing fibers.

The binder 34 of the strength layer 33 provides a medium that retains the reinforcing fibers 36. The retention of the reinforcing fibers 36 in the binder 34 is advantageous as the binder 34 with the reinforcing fibers 36 is easier to cut with shears during manufacturing, installation, or repair of the fiber optic cable 10 than cable having reinforcing fibers that are loosely disposed in the cable. In addition, the manufacturing of fiber optic cable 10 having the binder 34 with the reinforcing fibers 36 is easier to automate than cable having loose reinforcing fibers.

The strength layer 33 includes a first axial end 38, an oppositely disposed second axial end 40, a first longitudinal side 42, and a second longitudinal side 44. The strength layer 33 further includes a first surface 46 and an oppositely disposed second surface 48. The first and second surfaces 46, 48 extend between the first and second longitudinal sides 42, 44. In the depicted embodiment, the first surface 46 is an outer surface while the second surface 48 is an inner surface.

The strength layer assembly 14 further includes an outer layer 50 disposed on the first surface 46 of the strength layer 33. In the depicted embodiment, the outer layer 50 is a first conductive layer. The outer layer 50 has a first side end 52 that is disposed adjacent to the first longitudinal side 42 and an oppositely disposed second side end 54 that is disposed adjacent to the second longitudinal side 44. The first side end 52 is generally parallel to the first longitudinal side 42 while the second side end 54 is generally parallel to the second longitudinal side 44. The outer layer 50 extends the length of the strength layer 33 of the fiber optic cable 10. In the depicted embodiment, the outer layer 50 has a width that is less than a width of the binder 34. In this embodiment, the first side end 52 of the outer layer 50 is offset from the first longitudinal side 42 by a first offset distance $L_1$ and the second side end 54 of the outer layer 50 is offset from the second longitudinal side 44 by a second offset distance $L_2$ so that the binder 34 extends outwardly from the first and second side ends 52, 54 of the outer layer 50.

In the depicted embodiment, the outer layer 50 is made from a conductive material. In one embodiment, the outer layer 50 is formed from conductive tape (e.g., metalized polyester tape, metalized MYLAR® tape, etc.). In one embodiment, the conductive tape includes an adhesive surface 56 and an oppositely disposed conductive surface 58. The adhesive surface 56 is affixed to the first surface 46 of the strength layer 33.

The strength layer assembly 14 includes an inner layer 60 disposed on the second surface 48 of the strength layer 33. In one embodiment, the inner layer 60 is a second conductive layer. The inner layer 60 has a first side 62 that is disposed adjacent to the first longitudinal side 42 and an oppositely disposed second side 64 that is disposed adjacent to the second longitudinal side 44. The first side 62 is generally parallel to the first longitudinal side 42 while the second side 64 is generally parallel to the second longitudinal side 44. The inner layer 60 extends the length of the strength layer 33 of the fiber optic cable 10. In the depicted embodiment, the inner layer 60 has a width that is less than a width of the binder 34. In this embodiment, the first side 62 of the inner layer 60 is offset from the first longitudinal side 42 by a third offset distance $L_3$ and the second side 64 of the inner layer 60 is offset from the second longitudinal side 44 by a fourth offset distance $L_4$ so that the binder 34 extends outwardly from the first and second sides 62, 64 of the inner layer 60. In the depicted embodiment, the first, second, third and fourth offset distances $D_1$-$D_4$ are sized so that the outer layer 50 is separated from the inner layer 60 when the first and second longitudinal sides 42, 44 are overlapping.

In the depicted embodiment, the inner layer 60 is made from a conductive material. In one embodiment, the inner layer 60 is formed from conductive tape (e.g., metalized polyester tape, metalized MYLAR® tape, etc.). In one embodiment, the conductive tape includes an adhesive surface 66 and an oppositely disposed conductive surface 68. The adhesive surface 66 is affixed to the second surface 48 of the strength layer 33.

In the depicted embodiment, the strength layer assembly 14 includes a first longitudinal side portion 70 that is free of the outer and inner layers 50, 60 and an oppositely disposed second longitudinal side portion 72 that is free of the outer and inner layers 50, 60.

In the depicted embodiment of FIGS. 1 and 3, the strength layer assembly 14 is formed in the generally cylindrical shape by overlapping first and second longitudinal side portions 70, 72 so that the strength layer assembly 14 defines a longitudinal bore 74. In the depicted embodiment, the second surface 48 of defines the longitudinal bore 74. The optical fiber 12 is disposed within the longitudinal bore 74. As the first and second longitudinal side portions 70, 72 do not include the outer and inner layers 50, 60, the first and second longitudinal side portions 70, 72 can be overlapped without the outer and inner layers 50, 60 contacting.

The second axial end 40 is rotationally displaced from the first axial end 38 about a longitudinal axis 76 (shown as a dashed line in FIG. 1) of the strength layer assembly 14. In the subject embodiment, the strength layer assembly 14 is twisted about the longitudinal axis 76.

Figure 5:
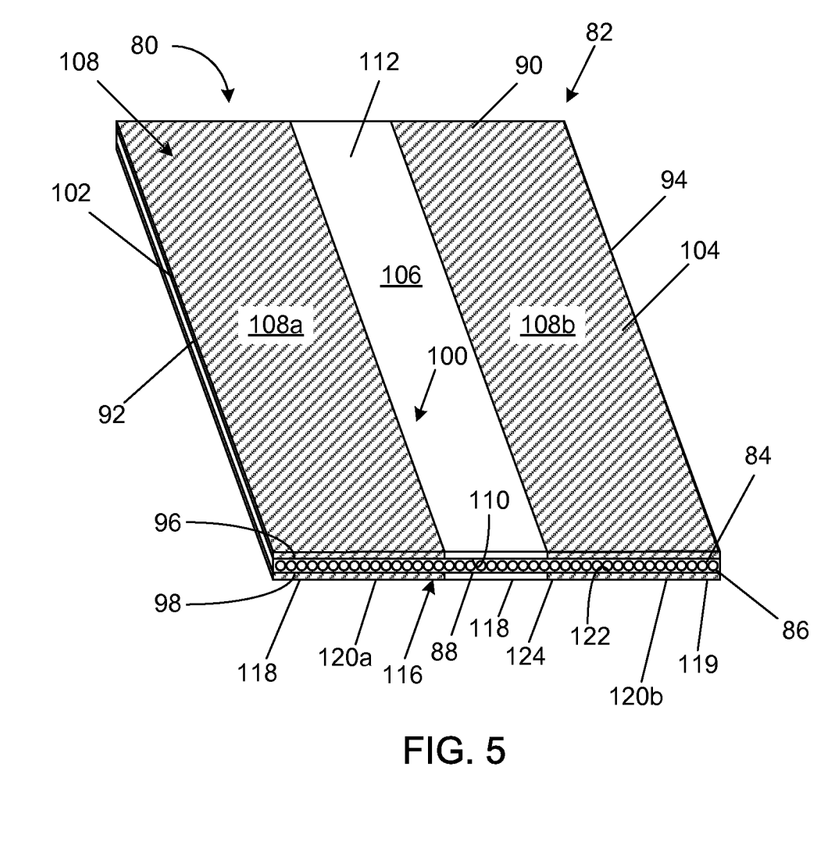
FIG. 5 is a perspective view of an alternate embodiment of a pre-formed strength layer assembly suitable for use with the fiber optic cable of FIG. 1.

Referring now to FIG. 5, an alternate embodiment of a strength layer assembly 80 is shown. The strength layer assembly 80 includes a strength layer 82 having a binder 84 and a plurality of reinforcing fibers 86 embedded or otherwise integrated within the binder 84. In one example embodiment, the binder 84 is a polymeric material such as ethylene acetate, acrylite (e.g., UV-cured, etc.), silicon (e.g., RTV, etc.), polyester films (e.g., biaxially oriented polyethylene terephthalate polyester film, etc.), and polyisobutylene. In other example instances, binder 84 may be a matrix material, an adhesive material, a finish material, or another type of material that binds, couples, or otherwise mechanically links together reinforcing fibers 86.

The reinforcing fibers 86 are strands that extend the length of the strength layer 82. In one embodiment, the reinforcing fibers 86 are aramid fibers. In another embodiment, the reinforcing fibers 86 are glass fibers, such as E-glass, S-glass, or another type of glass fiber.

The strength layer 82 includes a first axial end 88, an oppositely disposed second axial end 90, a first longitudinal side 92, and a second longitudinal side 94. The strength layer 82 further includes a first surface 96 and an oppositely disposed second surface 98. The first and second surfaces 96, 98 extend between the first and second longitudinal sides 92, 94.

The strength layer assembly 80 includes an outer layer 100 adjacent to the first surface 96 of the strength layer 82. The outer layer 100 has a first side end 102 that is disposed adjacent to the first longitudinal side 92 and an oppositely disposed second side end 104 that is disposed adjacent to the second longitudinal side 94. The outer layer 100 extends the length of the strength layer 82. In the depicted embodiment, the outer layer 100 has a width that is about equal to a width of the binder 84.

The outer layer 100 includes a first conductive portion 106 and a non-conductive portion 108. In the depicted embodiment, the outer layer 100 includes a first non-conductive portion 108a and a second non-conductive portion 108b. In the depicted embodiment, the first conductive portion 106 is disposed between the first and second non-conductive portions 108a, 108b.

The outer layer 100 includes a conductive layer that is coated with a dielectric material. The dielectric material is removed in the first conductive portion 106 to expose the conductive layer. In one embodiment, the outer layer 100 is formed from a dielectric coated conductive strip (e.g., metalized polyester tape, metalized MYLAR® tape, etc.). In one embodiment, the outer layer 100 includes a first surface 110 and an oppositely disposed second surface 112. The first surface 110 is disposed adjacent to the first surface 96 of the strength layer 82. In one embodiment, the first surface 110 is not affixed to the first surface 96 of the strength layer 82.

The strength layer assembly 80 includes an inner layer 116 disposed on the second surface 98 of the strength layer 82. The inner layer 116 has a first side 118 that is disposed adjacent to the first longitudinal side 92 and an oppositely disposed second side 119 that is disposed adjacent to the second longitudinal side 94. The inner layer 116 extends the length of the strength layer 82. In the depicted embodiment, the inner layer 116 has a width that is about equal to the width of the binder 84.

The inner layer 116 includes a second conductive portion 118 and a non-conductive portion 120. In the depicted embodiment, the inner layer 100 includes a first non-conductive portion 120a and a second non-conductive portion 120b. In the depicted embodiment, the second conductive portion 118 is disposed between the first and second non-conductive portions 120a, 120b.

The inner layer 116 includes a conductive layer that is coated with a dielectric material. The dielectric material is removed in the second conductive portion 118 to expose the conductive layer. In one embodiment, the inner layer 116 is formed from a dielectric coated conductive strip (e.g., metalized polyester tape, metalized MYLAR® tape, etc.). In one embodiment, the inner layer 116 includes a first surface 122 and an oppositely disposed second surface 124. The first surface 122 is disposed adjacent to the second surface 98 of the strength layer 82. In one embodiment, the first surface 122 is not affixed to the second surface 98 of the strength layer 82.

Figure 6:
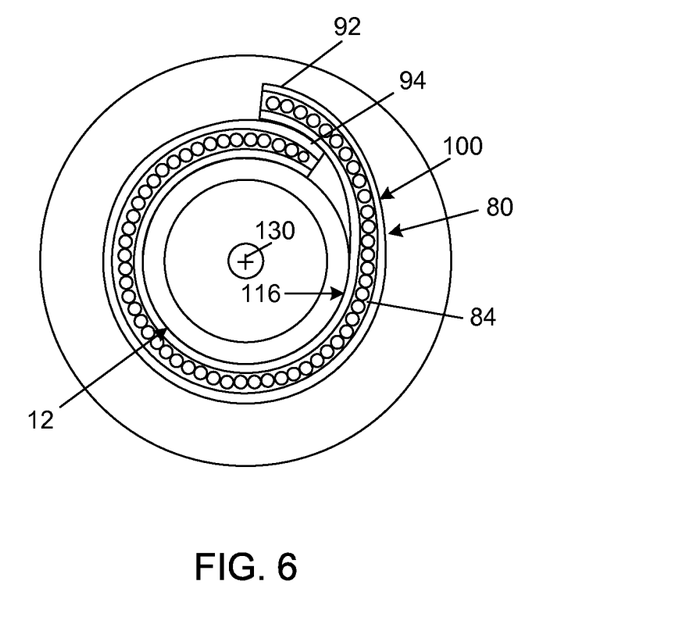
FIG. 6 is a cross-sectional view of an alternate embodiment of a fiber optic cable.

In the depicted embodiment of FIG. 6, the strength layer assembly 80 is formed in the generally cylindrical shape by overlapping the first and second longitudinal sides 92, 94 so that the strength layer assembly 80 defines a longitudinal bore 130 (shown as a "+" in FIG. 6). In the subject embodiment, the optical fiber 12 is disposed within the longitudinal bore 130.

As the outer and inner layers 100, 116 are about the same width as the binder 84, a portion of the first non-conductive portion 108a of the outer layer 100 is wrapped over a portion of the second non-conductive portion 120b of the inner layer 116. Alternatively, a portion of the first non-conductive portion 120a of the inner layer 116 is wrapped over a portion of the second non-conductive portion 108b of the outer layer 100. The first and second non-conductive portions 108a, 108b, 120a, 120b of the outer and inner layers 100, 116 prevent the first and second conductive portions 110, 120 from contacting.

Figure 7:
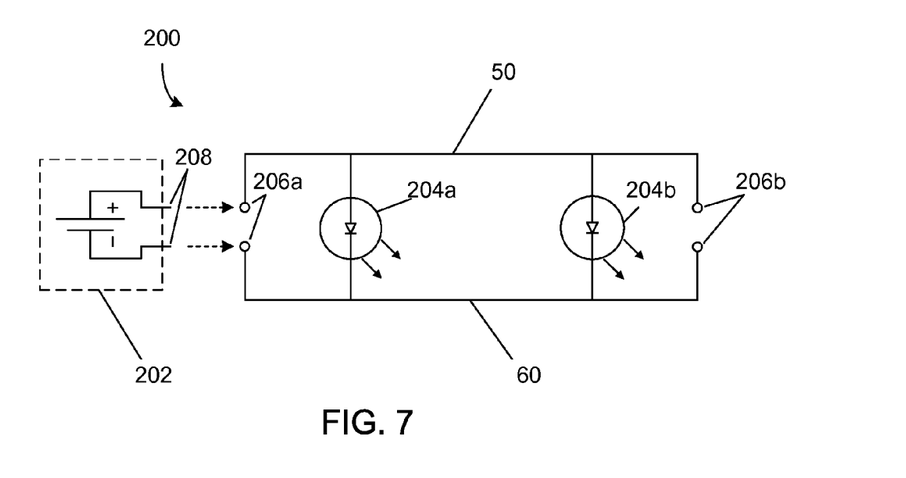
FIG. 7 is a schematic representation of a tracer light system circuit.
Figure 8:
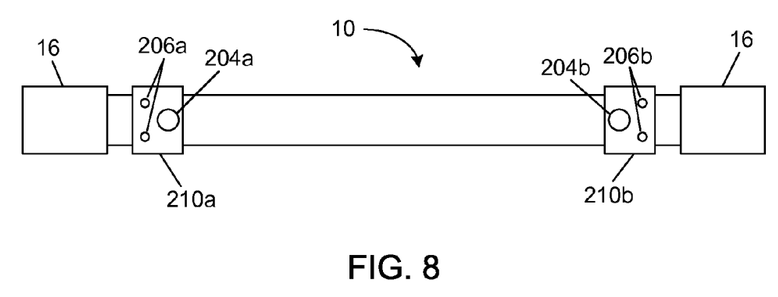
FIG. 8 is a schematic representation of a tracer light system installed on the fiber optic cable.

Referring now to FIGS. 7 and 8, a schematic representation of a tracer light system, generally designated 200, is shown. The tracer light system 200 can be used to identify an end of an individual fiber optic cable 10 when multiple fiber optic cables 10 are being routed through a particular location. The tracer light system 200 includes a power source 202, first and second tracer lights 204a, 204b, respectively, and first and second contacts 206a, 206b, respectively.

In the subject embodiment, the power source 202 is a device including mating contacts 208 that are adapted for electrical communication with one of the first and second contacts 206a, 206b. In the subject embodiment, the power source 202 further includes a battery (e.g., alkaline, nickel-cadmium, nickel-metal hydride, etc.).

In the depicted embodiment of FIG. 8, the first and second tracer lights 204a, 204b and the first and second contacts 206a, 206b are disposed in first and second housings 210a, 210b, respectively. Each of the first and second housings 210a, 210b is engaged with the fiber optic cable 10. In the subject embodiment, the first housing 210a is disposed at one end of the fiber optic cable 10 while the second housing 210b is disposed at an opposite end of the fiber optic cable 10.

Each of the first and second tracer lights 204a, 204b includes an illumination source (e.g., a light-emitting diode (LED), etc.). In the subject embodiment, the first tracer light 204a is in electrical communication with the first and second conductor layers 110, 120 of the fiber optic cable 10 and the first contacts 206a while the second tracer light 204b is in electrical communication with the first and second conductor layers 110, 120 and the second contacts 206b.

In operation, the mating contacts 208 of the power source 202 are placed electrical communication with one of the first and second contacts 206a, 206b in one of the first and second housings 210a, 210b of the fiber optic cable 10. With power supplied to the first and second conductor layers 110, 120 through one of the first and second contacts 206a, 206b, the first and second tracer lights 204a, 204b on the fiber optic cable 10 illuminate. With the first and second tracer lights 204a, 204b of the fiber optic cable 10 illuminated, the corresponding end of the fiber optic cable 10 can be quickly identified.

Figure 9:
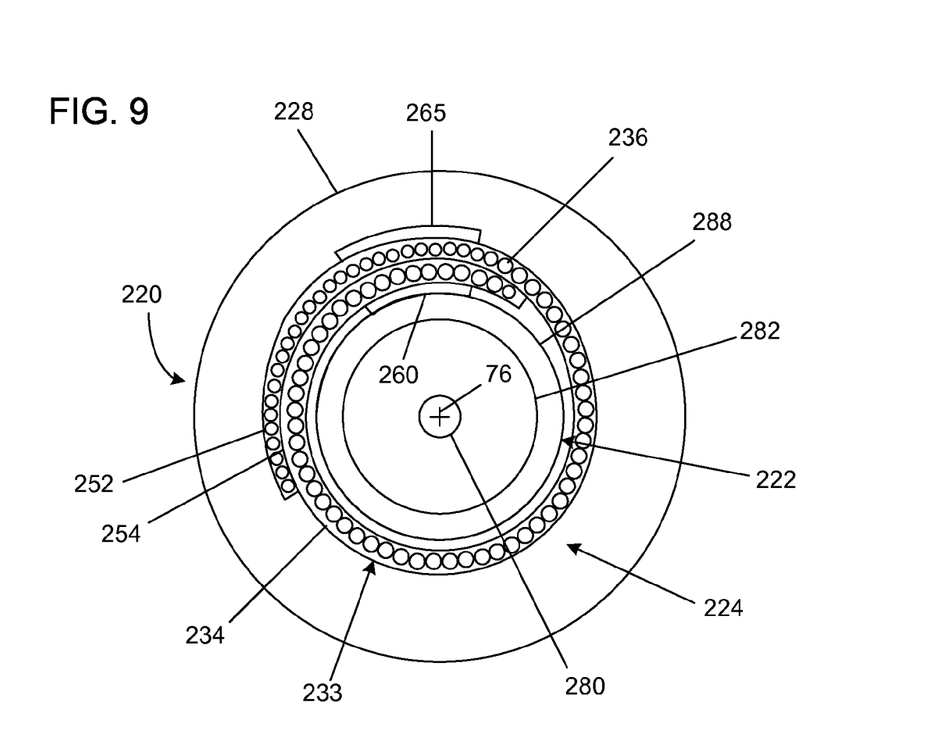
FIG. 9 is a cross-sectional view of an example fiber optic cable including a reinforcing sheet having circumferential overlap portions that circumferentially overlap one another by at least 90 degrees.
Figure 10:
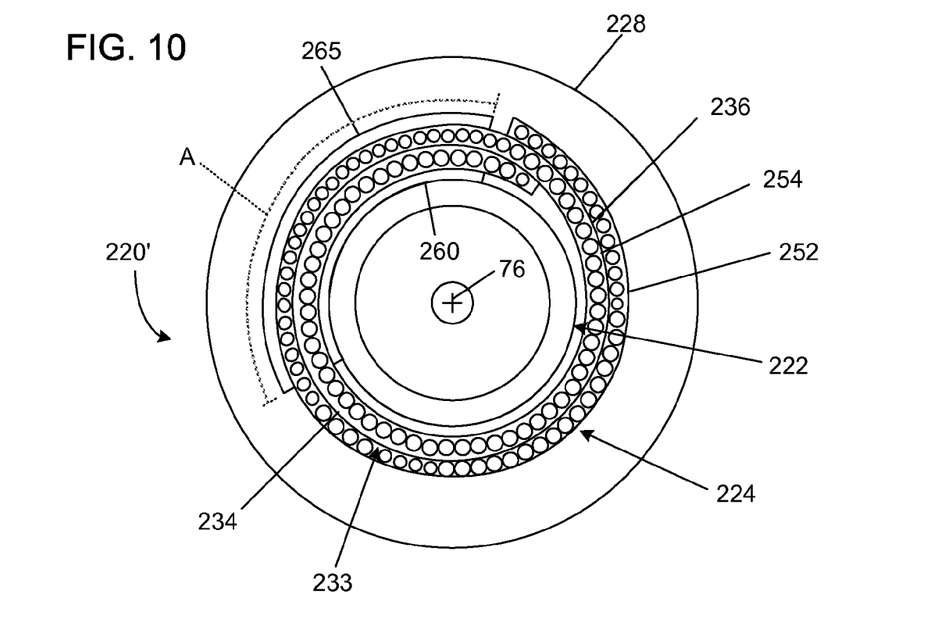
FIG. 10 is a cross-sectional view of an example fiber optic cable including a reinforcing sheet having circumferential overlap portions that circumferentially overlap one another by at least 360 degrees.

Referring to FIGS. 9 and 10, various example cables may include a strength layer having a reinforcing sheet that has circumferential overlap portions that circumferentially overlap one another by at least 90 degrees. For example, FIG. 9 illustrates an example cable 220 includes an optical fiber 222, a jacket 228 surrounding the optical fiber 222; and a strength layer 224 positioned between the optical fiber 222 and the jacket 228. The strength layer 224 includes a reinforcing sheet 233 including a plurality of reinforcing fibers 236. In certain implementations, the reinforcing sheet 233 include a binder material 234 that holds the reinforcing fibers 236 in place relative to one another.

The reinforcing sheet 233 extends around the central axis 76 and has circumferential overlap portions 252, 254 that circumferentially overlap one another by at least 90 degrees. In some implementations, the circumferential overlap portions 252, 254 of the strength layer 224 overlap one another by at least 180 degrees. In certain implementations, the circumferential overlap portions 252, 254 of the strength layer 224 overlap one another by at least 270 degrees. In certain implementations, the circumferential overlap portions 252, 254 overlap one another by at least 360 degrees (e.g., see cable 220' of FIG. 10).

In some implementations, the overlap is between about 30 degrees and about 90 degrees. In certain implementations, the overlap is between about 40 degrees and about 80 degrees. In certain implementations, the overlap is between about 45 degrees and about 70 degrees. In certain implementations, the overlap is between about 45 degrees and about 115 degrees. In certain implementations, the overlap is between about 75 degrees and about 120 degrees. In certain implementations, the overlap is between about 90 degrees and about 180 degrees. In certain implementations, the overlap is between about 100 degrees and about 200 degrees. In certain implementations, the overlap is between about 120 degrees and about 160 degrees. In certain implementations, the overlap is between about 150 degrees and about 230 degrees. In certain implementations, the overlap is between about 180 degrees and about 250 degrees. In certain implementations, the overlap is between about 200 degrees and about 255 degrees.

In certain implementations, the overlap is between about 260 degrees and about 360 degrees. In certain implementations, the overlap is between about 300 degrees and about 360 degrees. In certain implementations, the overlap is greater than 360 degrees. For example, in certain implementations, the overlap may be no more than about 720 degrees. the overlap may be no more than about 630 degrees. In certain implementations, the overlap may be no more than about 540 degrees. In certain implementations, the overlap may be no more than about 450 degrees.

In some implementations, the example cable 220, 220' has a central axis 76 and includes an optical fiber 222; a jacket 228 surrounding the optical fiber 222; a strength layer 224 positioned between the optical fiber 222 and the jacket 228; a first conductive strip 260 attached to the inner side of the strength layer 224; and a second conductive strip 265 attached to the outer side of the strength layer 224. The strength layer 224 includes a reinforcing sheet 233 including a plurality of reinforcing fibers 236. The reinforcing sheet 233 extends around the central axis 76 to form a cylindrical shape. The first and second conductive strips 260, 265 have lengths that extend along a length of the cable 220, 220'.

In some implementations, the optical fiber 222 of any of the above described cables 10, 220, 220' includes a core 280. The core 280 may be made of a plastic or glass material, such as a silica-based material, having an index of refraction. In one example implementation, the core 280 has an outer diameter of less than or equal to about 10 μm. The core 280 of each optical fiber 222 is surrounded by one or more cladding layers 282 that are also made of a plastic or glass material, such as a silica based-material. The cladding layer 282 has an index of refraction that is less than the index of refraction of the core 280. In one example implementation, the second cladding layer 282 has an outer diameter of less than or equal to about 125 μm.

A coating 288 surrounds the cladding layer(s) 282. The coating 288 has an interior surface that is immediately adjacent to the cladding layer 282. In some implementations, the optical fiber 222 of any of the above described cables 10, 220, 220' has an outer diameter that is less than or equal to 300 microns. In some implementations, the outer jacket 18, 228 of each of the above-described cables 10, 220, 220' has an outer diameter less than 2 millimeters. In certain implementations, the jacket 18, 228 has an outer diameter less than 1.5 millimeters. In certain implementations, the jacket 18, 228 has an outer diameter less than 1.4 millimeters. Indeed, in certain implementations, the jacket 18, 228 has an outer diameter less than 1.3 millimeters.

In certain implementations, the single coated optical fiber 222 is free to contact the reinforcing sheet 233. For example, certain types of example cables 220 do not include a buffer layer between the reinforcing sheet 233 and the single coated optical fiber 222. In some implementations, the strength layer 224 of the cable 220, 220' has an inner side and an outer side. The cable 220, 220' includes a first conductive strip 260 attached to the inner side and a second conductive strip 265 attached to the outer side. In some implementations, the first and second conductive strips 260, 265 include conductive tapes. In certain implementations, the first and second conductive strips 260, 265 are adhesively attached to the reinforcing sheet 233.

The first and second conductive strips 260, 265 have lengths that extend along a length of the cable 220. In certain implementations, the first conductive strip 260 has a transverse cross-sectional shape having a curvature that conforms to a curvature of the inner side of the strength layer 224 (e.g., an inner surface of the inner-most layer of the reinforcing sheet 233). The second conductive strip 265 has a transverse cross-sectional shape having a curvature that conforms to a curvature of the outer side of the strength layer 224 (e.g., an outer surface of the outer-most layer of the reinforcing sheet 233).

In some implementations, the cross-sectional shape of the first and/or second conductive strips 260, 265 has an arc (see arc A of FIG. 10) of less than 90 degrees (see FIG. 9). For example, in various implementations, the first and/or second conductive strips 260, 265 may have an arc of less than 70 degrees. In certain implementations, the arc may be no more than 60 degrees. In certain implementations, the arc may be no more than 50 degrees. In certain implementations, the arc may be no more than 45 degrees. In certain implementations, the arc may be no more than 40 degrees. In certain implementations, the arc may be no more than 30 degrees. In certain implementations, the arc may be no more than 25 degrees. In certain implementations, the arc may be no more than 20 degrees.

In some implementations, the arc length is between about 10 degrees and about 90 degrees. In certain implementations, the arc length is between about 20 degrees and about 80 degrees. In certain implementations, the arc length is between about 30 degrees and about 70 degrees. In certain implementations, the arc length is between about 20 degrees and about 50 degrees. In certain implementations, the arc length is between about 30 degrees and about 60 degrees. In certain implementations, the arc length is between about 70 degrees and about 90 degrees.

In other implementations, the cross-sectional shape of the first and/or second conductive strips 260, 265 has an arc of greater than 90 degrees (see FIG. 10). For example, in certain implementations, the cross-sectional shape of the first and/or second conductive strips 260, 265 has an arc of no more than 180 degrees. In certain implementations, the cross-sectional shape of the first and/or second conductive strips 260, 265 has an arc of no more than 120 degrees. In certain implementations, the cross-sectional shape of the first and/or second conductive strips 260, 265 has an arc of no more than 240 degrees. In certain implementations, the cross-sectional shape of the first and/or second conductive strips 260, 265 has an arc of no more than 270 degrees. In certain implementations, the cross-sectional shape of the first and/or second conductive strips 260, 265 has an arc of no more than 310 degrees. In certain implementations, the cross-sectional shape of the first and/or second conductive strips 260, 265 has an arc of no more than 360 degrees.

In some implementations, the arc length is between about 90 degrees and about 180 degrees. In certain implementations, the arc length is between about 100 degrees and about 160 degrees. In certain implementations, the arc length is between about 90 degrees and about 120 degrees. In certain implementations, the arc length is between about 110 degrees and about 160 degrees. In certain implementations, the arc length is between about 140 degrees and about 180 degrees. In certain implementations, the arc length is between about 160 degrees and about 200 degrees. In certain implementations, the arc length is between about 180 degrees and about 260 degrees. In certain implementations, the arc length is between about 200 degrees and about 250 degrees. In certain implementations, the arc length is between about 250 degrees and about 300 degrees.

In some implementations, the first conductive strip 260 is connected to ground and the second conductive strip 265 is connected to an electrical power source. In certain implementations, the first and second conductive strips 260, 265 are configured to carry at least 10 watts of electrical power. For example, in certain implementations, the first and second conductive strips 260, 265 are configured to carry from 10-30 watts of electrical power. In certain implementations, the first and second conductive strips 260, 265 are configured to carry at least 15 watts of electrical power.

In some implementations, the first and second conductive strips 260, 265 include conductive layers disposed on insulator layers. The conductive layer of the first conductive strip 260 faces radially toward the central axis 76 and the insulator layer of the first conductive strip 260 faces radially away from the central axis 76. The conductive layer of the second conductive strip 265 faces radially away from the central axis 76 and the insulator layer of the second conductive strip 265 faces radially toward the central axis 76.

Figure 11:
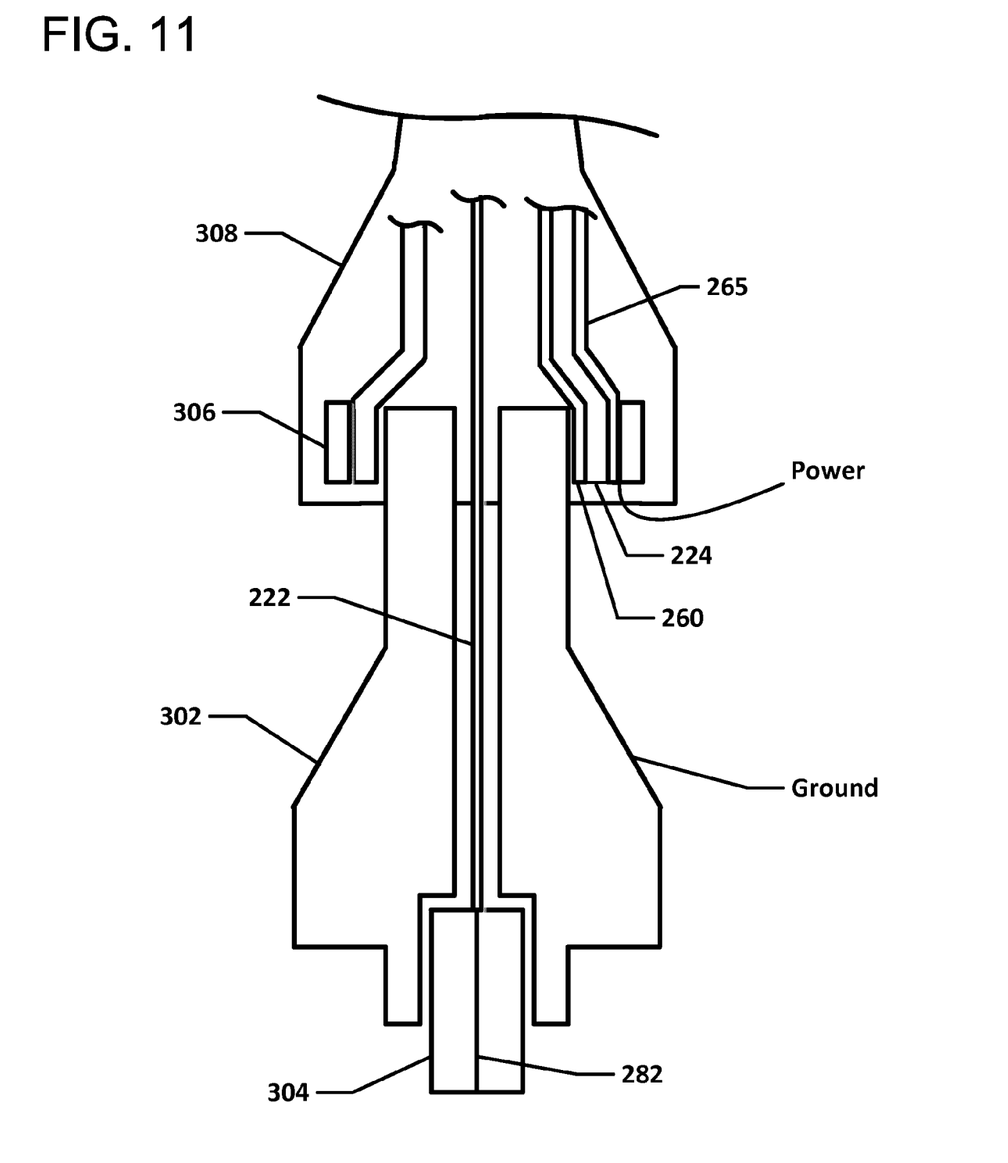
FIG. 11 is a schematic diagram of an example fiber optic connector mounted at an end of an example fiber optic cable with an inner contact and an outer contact crimped to the connector body.

As shown in FIG. 11, a fiber optic connector 300 may be mounted at an end of the cable 220, 220'. The connector 300 includes a connector body 302 holding a ferrule 304 at a front of the connector body 302. The optical fiber 222 extends through the connector body 302 to the ferrule 304. The uncoated optical fiber 282 extends into the ferrule 304. The strength layer 224 of the cable 220, 220' is coupled to the connector body 302. For example, the strength layer 224 may be crimped to the connector body 302 with a crimp ring 306 towards a rear of the connector body 302. In other implementations, the strength layer 224 may be otherwise secured to the connector body 302. A strain-relief boot 308 also may surround the cable 220, 220' and be coupled to the connector body 302.

In the example shown in FIG. 11, the inner contact 260 and outer contact 265 also are crimped to the connector body 302. The inner contact 260 engages or otherwise couples to the connector body 302, which may be grounded when in use. The outer contact 265 engages or otherwise couples to a power source. In some implementations, the outer contact 265 is positioned to engage a power contact when the connector 300 is inserted into an adapter or otherwise mated with another connector. In other implementations, the outer contact 265 engages the crimp ring 306, which engages the power contact. In still other implementations, power is supplied to an opposite end of the outer contact 265 so that the outer contact 265 and/or crimp ring 306 supply power to a device at the connector mating point.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A cable having a central axis, the cable comprising:
    an optical fiber;
    a jacket surrounding the optical fiber;
    a strength layer positioned between the optical fiber and the jacket, the strength layer including a reinforcing sheet including a plurality of reinforcing fibers, the reinforcing sheet extending around the central axis to form a cylindrical shape, the strength layer includes an inner side and an outer side; and
    a first conductive strip of tape attached to the inner side of the strength layer and a second conductive strip of tape attached to the outer side of the strength layer, the first and second conductive strips of tape having lengths that extend along a length of the cable.

2. The cable of claim 1, wherein the strength layer has circumferential overlap portions that circumferentially overlap one another by at least 90 degrees.

3. The cable of claim 2, wherein the circumferential overlap portions overlap one another by at least 180 degrees.

4. The cable of claim 2, wherein the circumferential overlap portions overlap one another by at least 360 degrees.

5. The cable of claim 1, wherein the jacket has an outer diameter less than 2 millimeters.

6. The cable of claim 1, wherein the jacket has an outer diameter less than 1.4 millimeters.

7. The cable of claim 1, wherein no buffer layer is provided between the reinforcing sheet and the optical fiber.

8. The cable of claim 1, wherein the first and second conductive strips of tape include conductive layers disposed on insulator layers, wherein the conductive layer of the first conductive strip of tape faces radially toward the central axis and the insulator layer of the first conductive strip faces radially away from the central axis, and wherein the conductive layer of the second conductive strip of tape faces radially away from the central axis and the insulator layer of the second conductive strip faces radially toward the central axis.

9. The cable of claim 1, wherein the first and second conductive strips are adhesively attached to the reinforcing sheet.

10. The cable of claim 1, wherein a fiber optic connector is mounted at an end of the cable, and wherein the first conductive strip of tape is connected to ground and the second conductive strip of tape is connected to an electrical power source.

11. A fiber optic cable comprising:
    an optical fiber;
    a strength layer assembly surrounding the optical fiber, the strength layer assembly including:
        a strength layer having a first longitudinal side, an oppositely disposed second longitudinal side, a first surface that extends between the first and second longitudinal sides and an oppositely disposed second surface, the strength layer including a binder and a plurality of reinforcing fibers embedded within the binder, the strength layer being arranged so that the first longitudinal side overlaps the second longitudinal side by at least 90 degrees to form a longitudinal bore in which the optical fiber is disposed;
        an outer layer of tape affixed to the first surface of the strength layer, the outer layer of tape having a first side end that is offset from the first longitudinal side by a first offset distance and a second side end that is offset from the second longitudinal side by a second offset distance, the outer layer of tape including a conductive surface facing away from the first surface of the strength layer;

an inner layer of tape affixed to the second surface of the strength layer, the inner layer including a second conductive surface;

an outer jacket surrounding the strength layer assembly.

12. The cable of claim 11, wherein the first and second longitudinal sides overlap one another by at least 180 degrees.

13. The cable of claim 11, wherein the first and second longitudinal sides overlap one another by at least 360 degrees.

14. The cable of claim 11, wherein the jacket has an outer diameter less than 2 millimeters.

15. The cable of claim 11, wherein the jacket has an outer diameter less than 1.4 millimeters.

16. The cable of claim 11, wherein no buffer layer is provided between the strength layer and the optical fiber.

17. The cable of claim 11, wherein a fiber optic connector is mounted at an end of the cable, and wherein the inner layer of tape is connected to ground and the outer layer of tape is connected to an electrical power source.

18. The cable of claim 11, wherein the electrical power source provides at least 10 watts of electrical power.

19. The cable of claim 11, wherein the inner layer of tape has a transverse cross-sectional shape having a curvature that conforms to a curvature of the inner side of the strength layer, and wherein the outer layer of tape has a transverse cross-sectional shape having a curvature that conforms to a curvature of the outer side of the strength layer.

20. The cable of claim 19, wherein no buffer layer is provided between the reinforcing sheet and the single coated optical fiber.

\* \* \* \* \*